United States Patent [19]

Keedy

[11] Patent Number: 4,688,770
[45] Date of Patent: Aug. 25, 1987

[54] GUIDE ASSEMBLY FOR CUTTING TORCH TIP

[75] Inventor: Edgar L. Keedy, Liberty Center, Ohio

[73] Assignee: V-K Enterprises, Inc., Detroit, Mich.

[21] Appl. No.: 821,749

[22] Filed: Jan. 23, 1986

Related U.S. Application Data

[63] Continuation-in-part of Ser. No. 742,929, Jun. 10, 1985, Pat. No. 4,579,318.

[51] Int. Cl.⁴ ............................................... B23K 7/10
[52] U.S. Cl. ......................................... 266/66; 266/68
[58] Field of Search ............................ 266/66, 68, 76

[56] References Cited

U.S. PATENT DOCUMENTS

| | | |
|---|---|---|
| 1,704,473 | 3/1929 | Greene .................................. 266/66 |
| 2,281,814 | 5/1942 | Willoughby ......................... 266/66 |
| 2,474,153 | 6/1949 | Livesay ................................ 266/68 |
| 2,486,575 | 11/1949 | Rooke ................................. 266/66 |
| 2,747,856 | 5/1956 | Burdwood .......................... 266/66 |
| 3,698,701 | 10/1972 | Straub ................................. 266/66 |

Primary Examiner—Wayland Stallard
Attorney, Agent, or Firm—Harnes, Dickey & Pierce

[57] ABSTRACT

A guide assembly for a torch tip for a hand held cutting torch with the guide assembly being operable to locate the torch tip a preselected distance from a workpiece whereby the tip will be substantially precluded from engaging the heated workpiece surface and with the guide assembly being selectively adjustable to vary the preselected distance and being actuable to guiding and non-guiding conditions.

10 Claims, 5 Drawing Figures

GUIDE ASSEMBLY FOR CUTTING TORCH TIP

REFERENCE TO RELATED APPLICATION

The present invention is a continuation-in-part of copending patent application Ser. No. 742,929 filed by Edgar L. Keedy on June 10, 1985 for Shield for Cutting Torch Tip, now U.S. Pat. No. 4,579,318.

SUMMARY - BACKGROUND OF THE INVENTION

The present invention relates to a cutting torch tip and guide therefor and more particularly to a cutting torch tip and guide assembly for use with a hand held cutting torch.

In utilizing a hand held torch for cutting metal workpieces the tip of the torch is located by the operator a selected distance from the workpiece. Occasionally in the cutting operation the tip will engage the heated metal proximate the kerf or cutting line. The result can be damage to the torch tip requiring its replacement. In addition the production of the operator will be interrupted by the time required to change tips.

In the present invention an adjustable guide assembly has been provided which is operative with the torch tip to protect the tip while still permitting the operator to have flexibility in the manipulation of the torch. The guide assembly has a guide rod adapted to contact the workpiece and which can be made of a high heat resistant material and in the present invention is selectively adjustable to permit the distance of the torch tip from the workpiece to be set at a desired height.

At the same time the guide assembly is secured to the torch adjacent to the tip with a pivotal structure so that the guide rod can be selectively pivoted away from the tip for those applications in which the operator prefers to operate with the guide assembly in a non-guiding condition. With this structure, the guide rod can be quickly pivoted back into its guide condition.

Thus it is an object of the present invention to provide a unique guide assembly construction for use with a cutting torch tip.

It is another object to provide such a guide assembly which has a guide rod readily, pivotally movable to or from guide positions and which is easily adjustable for selecting the desired height of the torch tip from the workpiece.

Other objects, features, and advantages of the present invention will become apparent from the subsequent description and the appended claims, taken in conjunction with the accompanying drawings, in which:

Figure 1:
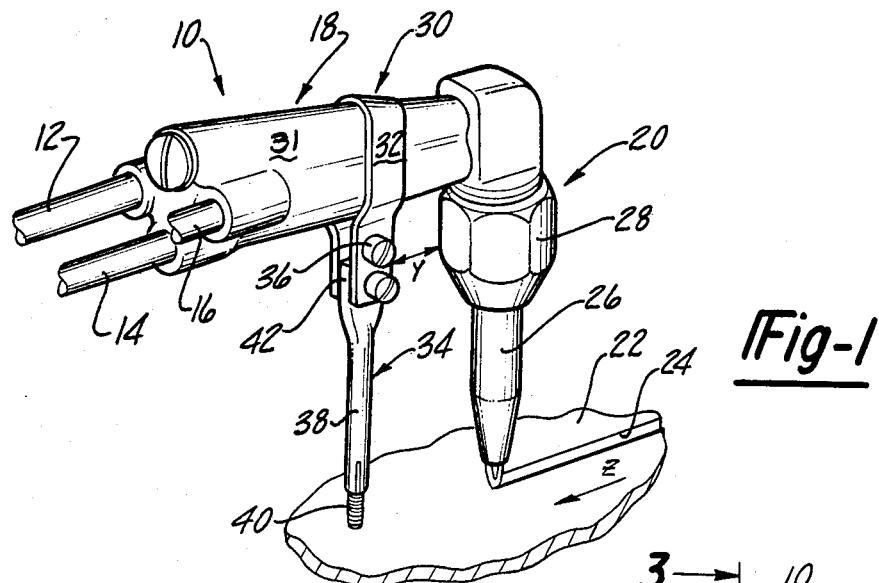
FIG. 1 is a fragmentary pictorial view depicting a portion of a hand held cutting torch with a cutting tip and with a guide assembly, embodying features of the present invention.

Looking now to FIG. 1 a hand held cutting torch 10 is only partially shown. The cutting torch 10 can be of a type known to those skilled in the art and can be the general configuration shown and described in the copending patent application Ser. No. 742,929 and hence details thereof have been omitted for purposes of simplicity; that disclosure, however, is incorporated herein by reference. Thus a torch 10, as partially shown, will conventionally include a handle and valve body, a manual operating valve and a pair of control valves (not shown). The control valve, via one flexible line, is connected to a source of oxygen while another flexible line is adapted to connect the control valve to a source of a gas fuel such as acetylene. Three tubes 12, 14 and 16 communicate the oxygen and fuel from the valve body to a cutting head 18 where the oxygen and fuel are finally mixed and transmitted out from a torch tip assembly 20 and ignited for cutting a workpiece 22 along a cutting line or kerf 24. The cutting head 18 includes a generally longitudinally extending body member 31 with the tip assembly 20 depending generally laterally therefrom.

The tip assembly 20 includes a torch tip 26 which is removably secured to the cutting head 18 via a threaded fitting 28. A guide assembly 30 is removably secured to the cutting head 18.

The guide assembly 30 includes a flexible generally U-shaped clamp 32 and a guide rod assembly 34. The clamp 32 is adapted to straddle the portion of the cutting head 18 proximate the tip assembly 20. The precise distance "y" between the clamp 32, and hence guide assembly 30, and the tip assembly 20, can be, to a limited degree, set by the operator. A threaded fastener 36 holds the clamp 32 tightly to the cutting head 18.

The guide rod assembly 34 includes a generally tubular support tube 38 and a guide rod 40. The support tube 38 is flattened at its upper end 42 and is adapted to fit between the lower end portions 44 of the legs of clamp 32. The lower end portions 44 are offset towards each other to facilitate clamping via the fastener 36 and to facilitate receiving the flattened upper end 42 of support tube 38. A second fastener 46 is adapted to releasably clamp the flattened end 42 of the support tube 38 between the lower end portions 44.

The lower end of the support tube 38 is partially threaded and adapted to threadably receive the guide rod 40 which has its mating end similarly threaded. Thus the distance x that the guide rod 40 extends beyond the end of the support tube 38 can be selectively set by the operator.

Figure 2:
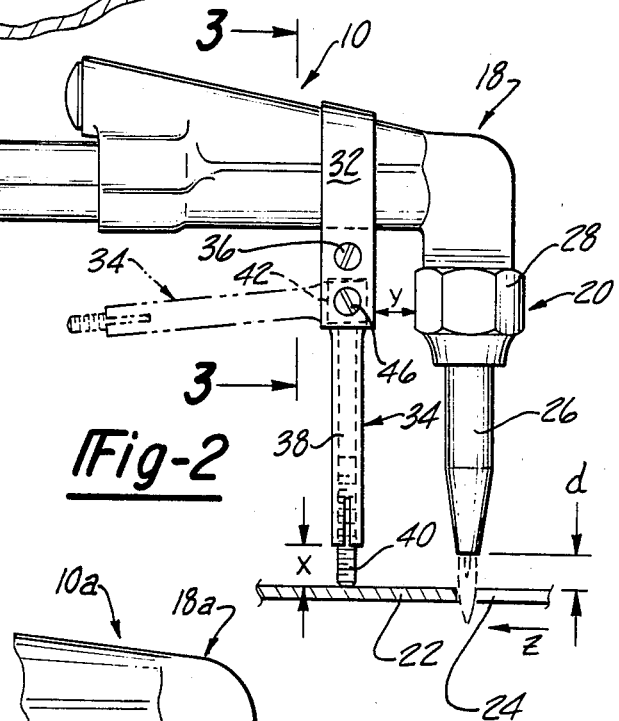
FIG. 2 is a fragmentary side elevational view, to enlarged scale, of the cutting tip and guide assembly of FIG. 1 with the guide assembly shown in phantom as pivoted to its non-guiding condition.

Thus in operation, the guide rod assembly 34 is pivoted to its depending, guide position as shown in FIGS. 1 and 2 and is held there by the action of fastener 46. The desired height d of the tip 26 above the workpiece 22 can be set by adjusting the distance x that the guide rod 40 extends beyond the support tube 38. The noted adjustment can also accommodate wear on the guide rod 40 and variations between different torches, torch tips and the like. In a preferred form of the invention the guide rod 40 is manufactured of a suitable heat resistant material such as tungsten carbide, stainless steel or the like.

As can be seen in FIG. 2, if the operator prefers to operate the torch 10 in some situations without use of the guide assembly 30, the guide rod assembly 34 can be simply pivoted rearwardly out of the guide position by manipulating the fastener 46. Note that this selective pivotal action can also be utilized to vary the location of the guide rod 40 in its guide position by only partially pivoting the guide rod assembly 34 towards or away from the tip assembly 20.

The guide assembly 30 is located in back of the tip assembly 20 and hence will precede the cutline or kerf 24 as the torch 10 is moved in a cutting direction z. This location protects the guide rod 40 from movement into the hot metal resulting from kerf formation and at the same time permits the operator to have a clear view of the kerf line 24. Because the support tube 38 and guide rod 40 of the guide rod assembly 34 are relatively small in diameter, the operator is provided with a good view of the line along which the desired cut is to be made. In one form of the invention the outside diameter of the support tube 38 was around ¼ inch while that of the guide rod 40 was around 3/16 inch.

Figure 3:
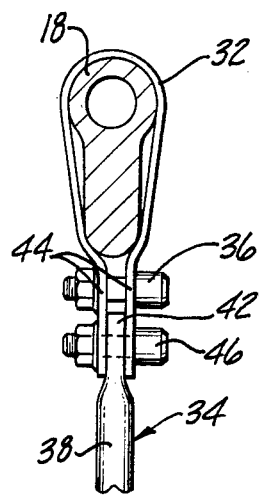
FIG. 3 is a sectional view of the cutting tip and guide assembly of FIG. 2 taken generally along the line 3—3 in FIG. 2.
Figures 4, 5:
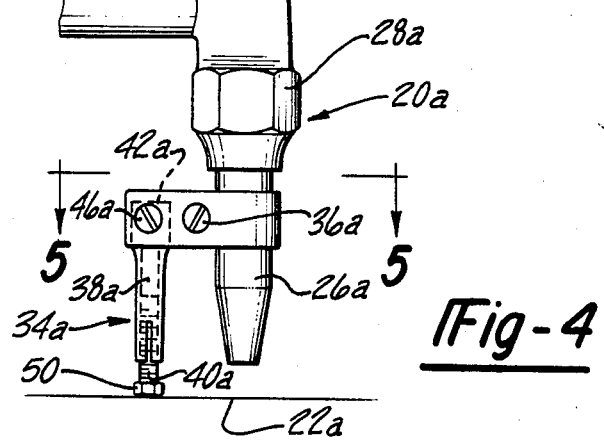
FIG. 4 is a side elevational view of a modified embodiment of the guide assembly of FIGS. 1-3.
FIG. 5 is a sectional view of the torch tip and guide assembly of FIG. 4 taken generally along the line 5—5 in FIG. 4.

In some applications it may be desirable that the guide assembly be adapted to be secured to the torch tip. Such a construction is shown in the embodiment of FIGS. 4 and 5 where components similar to like components in the embodiment of FIGS. 1-3 are given the same numerical designation with the addition of the letter postscript "a".

Thus the guide assembly 30a includes a flexible generally U-shaped clamp 32a and a guide rod assembly 34a. The clamp 32a is adapted to straddle the torch tip 26a such that the end portions 44a extend rearwardly from the torch tip 26a. A threaded fastener 36a holds the clamp 32a tightly to the torch tip 26a.

The guide rod assembly 34a includes a generally tubular support tube 38a and a guide rod 40a. The support tube 38a is flattened at its upper end 42a and is adapted to fit between the end portions 44a of the legs of clamp 32a. The end portions 44a are offset towards each other to facilitate clamping via the fastener 36a and to facilitate receiving the flattened upper end 42a of support tube 38a. A second fastener 46a is adapted to releasably clamp the support tube 38a between the end portions 44a.

The lower end of the support tube 38a is partially threaded and adapted to threadably receive the guide rod 40a which has its mating end similarly threaded. Thus the distance that the guide rod 40a extends beyond the end of the support tube 38a can be selectively set by the operator. Note that guide rod 40a can be in the form of a threaded bolt and as such has an enlarged head portion 50 to facilitate manipulation in height adjustment.

Thus in operation, the guide rod assembly 34a is pivoted to its depending, guide position as shown in FIG. 4 and is held there by the action of fastener 46a. The desired height of the tip 26a above the workpiece 22a can be set by adjusting the distance that the guide rod 40a extends beyond the support tube 38a. The noted adjustment can also accommodate wear on the guide rod 40a and variations between different torches, torch tips and the like. In addition the height adjustment can be varied by moving the entire guide assembly 30a up or down along the torch tip 26a. Thus the guide assembly 30a has a course height adjustment via the latter movement along the torch tip 26a, and a fine adjustment via the threaded connection of guide rod 40a.

As with the embodiment of FIGS. 1-3, the guide rod assembly 34a can be pivoted away from the torch tip 26a to its non-guiding position. This selective pivotal action can also be utilized to vary the location of the guide rod 40a in its guide position by only partially pivoting the guide rod assembly 34a towards or away from the tip assembly 26a.

As shown in FIGS. 4 and 5, the guide 30a is located in back of the tip assembly 20a and hence will precede the cutline or kerf as the torch 10a is moved in a rearward cutting direction, i.e. such as direction z in FIGS. 1-3. This location protects the guide rod 40a from movement into the hot metal resulting from kerf formation and at the same time permits the operator to have a clear view of the kerf line 24a.

In addition, however, the guide assembly 30a can be rotated relative to the longitudinal axis of the torch tip 26a to any desired angular position thereby permitting maximum flexibility to the operator, i.e. the guide assembly 30a could be rotated 180° to place the guide rod assembly 34a at the front of the torch tip 26a or to any other location such as to place the guide rod assembly 34a to either side of torch tip 26a.

Thus a guide assembly for a hand held cutting torch has been provided which is versatile in its adjustment and application for protecting a torch tip from damage during cutting.

While it will be apparent that the preferred embodiments of the invention disclosed are well calculated to fulfill the objects above stated, it will be appreciated that the invention is susceptible to modification, variation and change without departing from the proper scope or fair meaning of the invention.

I claim:

1. In a hand held cutting torch having a removable tubular cutting tip for cutting a workpiece along a cut line the invention comprising:

a guide assembly secured to the torch proximate to the cutting tip and being selectively actuable to a guiding or a non-guiding condition;

said guide assembly including a guide rod structure and clamp means for releasably securing said guide rod structure for actuation between said guiding and non-guiding conditions, said guide rod structure including a guide rod adapted to engage the workpiece in said guiding condition to locate the cutting tip a preselected distance above the workpiece during cutting, said guide assembly including height adjustment means for providing selective adjustment of the position of said guide rod relative to the cutting tip when in said guide condition for selectively varying said preselected distance, said guide assembly including pivot means for securing said guide rod structure for pivotal movement away from the cutting tip to said non-guiding condition and towards the cutting tip to said guiding condition, said guide rod structure including a support member with said height adjustment means including an adjustable connection between said support member and said guide rod whereby height adjustment of said guide rod can be accomplished, said guide rod being constructed of a high temperature resistant material, said support member being extensible generally to a location where its lower extremity is proximate to the height of the end of the cutting tip whereby the length of said guide rod required for height adjustment can be minimized.

2. The apparatus of claim 1 with said pivot means being operable to locate said guide rod structure at a plurality of intermediate positions relative to the cutting tip in said guide condition.

3. The apparatus of claim 1 with said guide assembly being rotatable relative to the axis of the cutting tip to circumferentially locate said guide rod structure to substantially any radially offset operative position in said guide condition.

4. The apparatus of claim 1 with said adjustable connection between said support member and said guide rod being a threaded connection and with said guide rod being of a threaded bolt structure having an enlarged head to facilitate gripping for height adjustment.

5. The apparatus of claim 1 with said adjustable connection between said support member and said guide rod being a threaded connection.

6. The apparatus of claim 1 with said clamp means adapted to be clampingly engaged about the body member to locate said guide rod structure a preselected distance from the cutting tip.

7. The apparatus of claim 1 with said clamp means adapted to be clampingly engaged about the cutting tip to locate said guide rod structure a preselected distance from the cutting tip.

8. The apparatus of claim 7 with said guide assembly being rotatable relative to the axis of the cutting tip to circumferentially locate said guide rod structure to substantially any radially offset operative position in said guide condition.

9. The apparatus of claim 1 with said support structure having an open end portion being generally tubular and with said guide rod being generally round to matably fit within said open end portion of said support structure, said support structure and said guide rod being of a generally small, limited diameter less than that of the cutting tip whereby obstruction of the view of the cut line by said guide assembly is minimized.

10. The apparatus of claim 9 with said open end portion being of a diameter generally around ¼ inch with the diameter of said guide rod being around 3/16 inch.

* * * * *